United States Patent Office 3,381,247
Patented Apr. 30, 1968

3,381,247
TRIPPING MEANS FOR HIGH SPEED CIRCUIT INTERRUPTERS
Gayne D. Gamel, Murrysville, and Joseph D. Findley, Jr., Pittsburgh, Pa., assignors to Westinghouse Electric Corporation, a corporation of Pennsylvania
Filed Aug. 26, 1966, Ser. No. 575,385
6 Claims. (Cl. 335—6)

ABSTRACT OF THE DISCLOSURE

A circuit interrupter having a tripping means comprising a first means which is responsive to a predetermined rate of rise of the current in a protected circuit and a second means which is responsive to a predetermined magnitude of current independent of its rate of rise including a magnetic sheet member movable in response to changes in the current.

---

This invention relates to circuit interrupters and more particularly to tripping means for such interrupters.

High speed, direct-current circuit interrupters or circuit breakers which are intended primarily for use as protective devices for circuits including semiconductor or other rectifier assemblies must be made to open as quickly as possible when an abnormal operating condition or fault occurs in the circuit to be protected. In order to obtain fast mechanical action, such circuit interrupters are usually equipped with a tripping means that includes an electromagnetic holding device which is arranged to release an armature when certain abnormal currents occur in the associated circuit. In one type of known tripping means, the release of the armature from the associated holding magnet has been achieved by directing part or all of the current through the circuit interrupter into a conductor or bucking bar which passes through the holding magnet to produce a magnetomotive force which opposes the magnetomotive force produced by current flow through a holding coil which is provided on the holding magnet. With this arrangement, the value of current at which the circuit interrupter is actuated to trip open varies to a large extent with the rate of change of current in the associated circuit with respect to time or with the rate of rise of the current in the associated circuit when a fault condition occurs. This type of tripping means has been found to be very effective in responding to fault currents which rise at relatively rapid rates, such as rates which exceed 500,000 amperes per second. In certain applications however, it is necessary to provide a tripping means for circuit interrupters of the type described which responds rapidly to a predetermined magnitude of fault current in the associated circuit to actuate the associated circuit interrupter to trip open independently of the rate of change of the current in the associated circuit with respect to time which preceded the occurrence of the predetermined magnitude of current in the associated circuit. It is therefore desirable to provide an improved tripping means for circuit interrupters of the type described which responds independently to both the rate of rise of current in the associated circuit and to a predetermined magnitude of current in the circuit to be protected.

It is an object of this invention to provide a new and improved means for tripping a circuit interrupter.

Another object of this invention is to provide an improved circuit interrupter including means for independently tripping the circuit interrupter in response to the rate of rise of current through the current interrupter or in response to a predetermined magnitude of current through the circuit interrupter.

A further object of this invention is to provide an improved current responsive device which responds to a predetermined magnitude of current in an associated conductor.

Other objects of the invention will, in part, be obvious and will, in part, appear hereinafter.

For a fuller understanding of the nature and objects of the invention, reference should be had to the following detailed description, taken in conjunction with the accompanying drawings in which.

Figure 1:
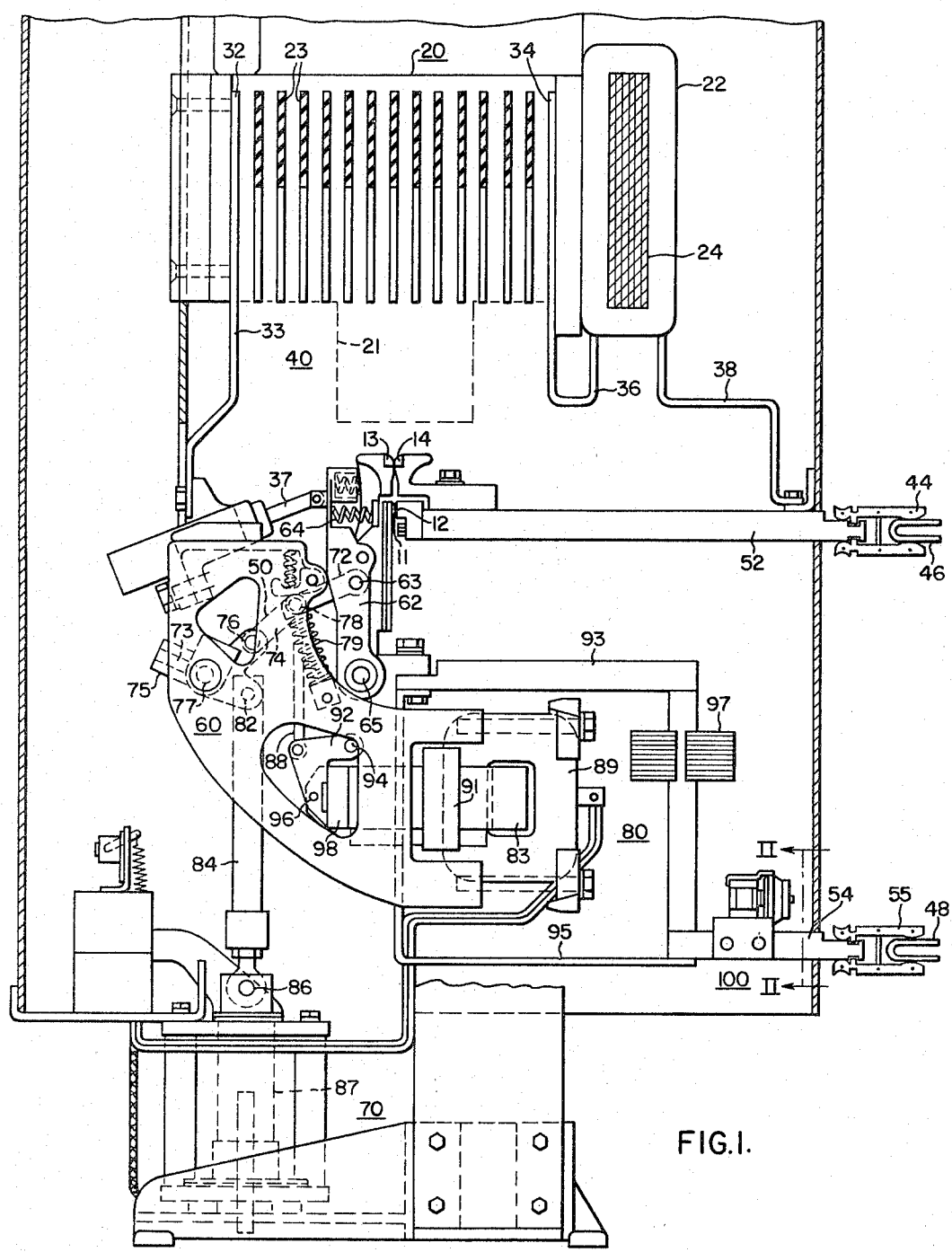
FIGURE 1 is a side elevational view, partly in section, of a direct current interrupter embodying the principles of the invention with the interrupter shown in the closed circuit position.
Figure 3:
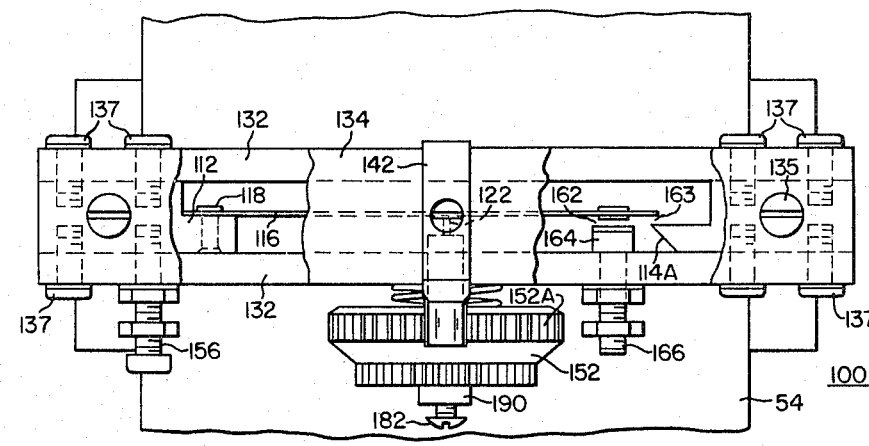
FIG. 3 is a top plan view of the tripping means shown in FIG. 2, with certain portions cut away.
Figure 6:
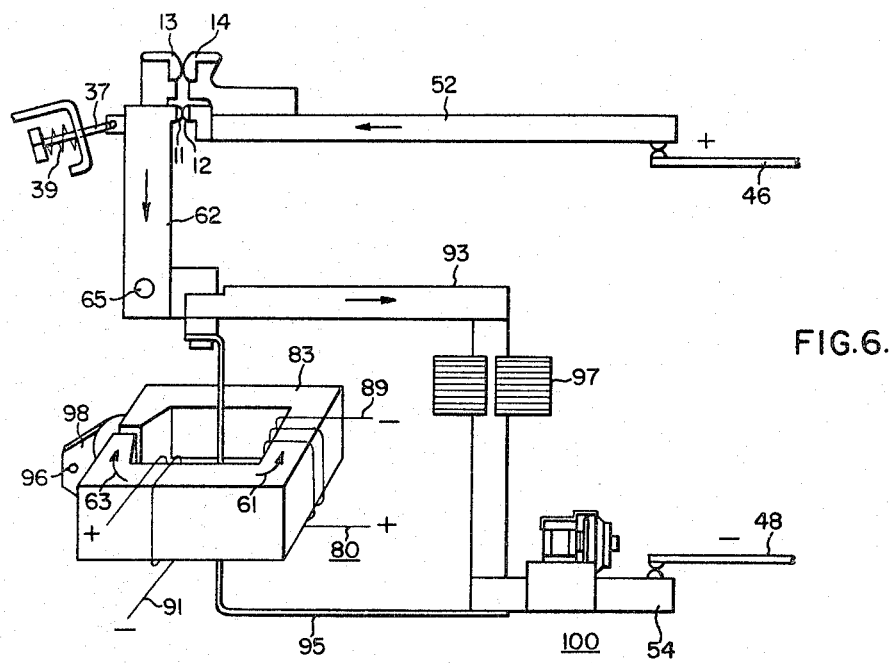
Figure 7:
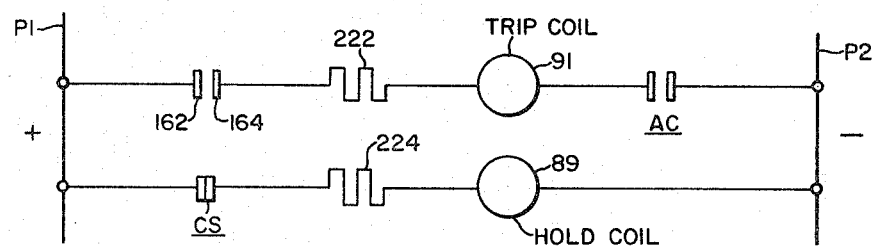

FIG. 6 is a diagrammatic representation of the circuit interrupter shown in FIG. 1, with many of its parts omitted, to more clearly illustrate the operation of the circuit interrupter, the contacts of the circuit interrupter being shown in the closed circuit position; and FIG. 7 is a schematic drawing illustrating the electrical connections of the tripping means which forms part of the circuit interrupter shown in FIG. 1 to a source of direct current power.

Referring now to the drawings and FIGURE 1 in particular, there is illustrated a direct current circuit interrupter or circuit breaker which is particularly adapted for the protection of circuits including semiconductor rectifier assemblies. The circuit interrupter shown in FIG. 1 comprises a pair of separable main contacts 11, 12 which are shunted or electrically connected in parallel with a pair of separable arcing contacts 13, 14 when the circuit interrupter is in the closed position, as shown in FIG. 1. The relatively stationary main contact 12 and the relatively stationary arcing contact 14 are mounted on and electrically connected to one end of the upper conducting stud 52 whose other end may engage a plurality of disconnecting fingers 44 which are biased inwardly by spring means (not shown) to engage both the conducting stud 52 and a terminal stud 46 which may be associated with a cell or housing structure (not shown). The movable main contact 11 and the movable arcing contact 13 are both resiliently mounted on and electrically connected to the upper end of a pivoted switch or contact arm 62 which is biased in an opening direction by a compression spring 39 through a connecting rod 37 which is pivotally connected to the upper end of the switch arm 62, as shown diagrammatically in FIG. 6. The lower end of the switch arm or contact arm 62 is pivotally mounted on a stationary pivot 65 which, in turn, is supported at one end of a conducting stud or bus bar 93 which also electrically connects the switch arm 62 to one end of the lower conducting stud 54, as shown in FIG. 1. The other end of the lower conducting stud 54, as illustrated, is engaged by a plurality of disconnecting fingers 55 which may also engage a terminal stud 48. A conductor 95 is electrically connected in parallel with the bus bar 93 and also passes through the holding magnet structure 80 which normally holds the switch arm 62 in the closed position shown in FIG. 1 through a first toggle means 50 and a second toggle means 60, which will be described in detail hereinafter.

In order to interrupt the arc which results when the separable contacts of the circuit interrupter shown in FIG. 1 are opened, the arc chute structure 40 is disposed above the separable contacts of the circuit interrupter. The arc chute 40 includes a plurality of spaced insulating plates 23 and a pair of spaced arc horns 32 and 34 which are disposed at the opposite ends of the arc chute 40. In order to draw the arc, which results when the separable contacts of the circuit interrupter are opened, upwardly into the arc chute 40, the blowout magnet structure 20 is disposed to cooperate with the arc chute 40 and comprises a magnetic core which includes a pair of side pole plates 21, only one of which is shown in FIG. 1, and a bight portion 24 on which a blowout coil 22 is inductively disposed. One end of the blowout coil 22 is electrically connected to the upper conducting stud 52 and the associated stationary contacts 12 and 14 through the connector 38, while the other end of the blowout coil 22 is electrically connected to the arc horn 34 through the connector 36 to be energized whenever the separable contacts of the circuit interrupter shown in FIG. 1 are opened to form an arc therebetween which is subsequently transferred to the arc horns 32 and 34. It is to be noted that the arc horn 32 at the left end of the arc chute 40, as viewed in FIG. 1, is electrically connected to the switch arm 62 and the movable contacts 11 and 13 through suitable conducting means (not shown).

In order to actuate the separable contacts of the circuit interrupter shown in FIG. 1 between the open and closed positions, the contact arm or switch arm 62 is operatively connected to the closing solenoid 70 and to the holding magnet 80 by the first toggle means 50 and the second toggle means 60. In particular, the first toggle means 50 includes a pair of toggle links 72, 74 which are pivotally connected at the knee joint or pivot pin 78. The right end of the toggle link 72 is pivotally connected, as indicated at 63, to the rotatable contact arm 62, while the left end of the oher toggle link 74 is pivotally connected to the knee joint or pivot pin 76 of the second toggle means 60. The second toggle means 60 comprises the toggle link 74 and a closing lever casting 75 which are pivotally connected at the pivot pin or knee joint 76. The lower end of the closing lever casting 75 is pivotally connected, as indicated at 82, to the upper end of a pull rod 84. The closing lever casting 75 is pivotally mounted on a fixed pivot 77 and has an opening 73 therein which is adapted to receive a manual closing handle (not shown). The pull rod 84 is pivotally connected at the lower end, as indicated at 86, to the armature 87 of the closing solenoid 70.

In order to permit closing of the contact arm 62, either by manual rotation of the closing lever casting 75 or by energization of the closing solenoid 70, the knee pin 78 of the first toggle means 50 must be held in the position shown in FIG. 1 by the holding magnet 80. In particular, the knee pin 78 of the first toggle means 50 is pivotally connected by the connecting link 88 to the crank arm 92 which, in turn, is pivotally connected to the movable armature 98 of the holding magnet 80, as indicated at 96, and which is pivotally supported by a fixed pivot pin 94, as shown in FIG. 1. The knee pin 78 of the first toggle means 50 is biased upwardly in a direction tending to collapse the first toggle means 50 by the compression spring 79 which is disposed between the knee pin 78 and a fixed spring support but is normally restrained from such upward movement by the force exerted on the knee pin 78 by the holding magnet 80 through the crank arm 92 and the connecting link 88 as long as the armature 98 of the holding magnet 80 is held in an attracted position with respect to the associated generally U-shaped or C-shaped stationary magnet structure 83, as best shown in FIG. 6. In order to hold the armature 98 of the holding magnet 80 in the attracted position, as shown in FIGS. 1 and 6, a holding coil 89 is inductively disposed on the stationary magnet structure 83 of the holding magnet 80 and may be normally energized from a source of direct current power or voltage, as indicated at the terminals P1 and P2 in FIG. 7, through a series resistor 224 and the normally closed contacts CS of a suitable manually operable control switch (not shown).

Considering the operation of the operating mechanism of the circuit interrupter shown in FIG. 1, it is to be noted that the second toggle means 60 is over center in the closed circuit position of the circuit interrupter shown in FIG. 1 but that the second toggle means 60 is prevented from moving further by the compressive force present in the pull rod 84 when the armature or plunger 87 of the closing solenoid 70 hits the bottom of the closing solenoid 70. In this operating condition of the circuit interrupter, the first toggle means 50 does not go over center, but the toggle means 50 cannot collapse as long as the armature 98 is held by the magnetic attraction of the holding magnet 80. When however, the armature 98 of the holding magnet 80 is released in response to the actuation of an associated tripping means which will be described hereinafter, the knee pivot pin 78 of the first toggle means 50 will move upwardly under the influence of the spring 79 which causes the first toggle means 50 to collapse and the contact arm 62 will be pulled open by the compression spring 39 shown in FIG. 6. When the contact arm 62 is actuated from the closed position shown in FIG. 1 to the open position, the knee pin 76 of the second toggle means 60 remains nearly stationary until the contact arm 62 reaches the open position. Then the knee pin 76 of the second toggle means 50 is moved upwardly by a biasing spring (not shown) which is provided in the closing solenoid 70 to apply an upwardly biasing force to the armature 87 of the closing solenoid 70. It is to be noted that when the contact arm at 62 is actuated from the closed position shown in FIG. 1 to the open position, the main contacts 11, 12 will separate prior to the arcing contacts 13, 14. When the arcing contacts 13, 14 separate, the arc drawn therebetween will move upwardly and transfer to the arc horns 32, 34 and will then move further into the arc chute 40 in which arc extinction will occur. The magnetic field set up between the two pole plates 21 of the blowout magnet structure 20 by energization of the blowout coil 22 will assist the upward movement of the arc along the arc horns 32, 34.

In order to actuate the release of the armature 98 of the holding magnet 80 and to thereby open the separable contacts of the circuit interrupter shown in FIG. 1 in response to a relatively rapid rate of change or rise with respect to time of the current which is flowing in the circuit to which the circuit interrupter is connected and which flows through the separable contacts of the circuit interrupter, the circuit interrupter shown in FIG. 1 includes a first tripping means which comprises the conductor or bucking bar 95 which passes through the holding magnet 80 and the laminated magnetic structure 97 which includes one or more predetermined air gaps and which is disposed in inductive relation with the main current carrying conductor 93 of the circuit interrupter. It is to be noted that only a portion of the current which flows through the circuit interrupter shown in FIG. 1 between the upper and lower conducting studs 52 and 54, respectively, flows through the bucking bar 95 since the resistance of the conducting path which includes the conductor 93 is relatively much lower than the resistance of the conducting path which includes the bucking bar 95. It is also to be noted that the magnetic flux which is produced in the holding magnet 80 due to the magnetomotive force which results when current flows in the bucking bar 95 opposes the magnetic flux which is produced by the magnetomotive force that results when current flows in the conductor turns of the holding coil 89. During normal operating conditions when the rate of rise of the current which flows through the separable contacts of the circuit interrupter does not exceed a desired predetermined value, such as 500,000 amperes per second, the magnetomotive force which results due to current flow in the holding coil 89 is arranged to be several times greater than the magnetomotive force which results due to current flow in the bucking bar or conductor 95 in order that the armature 98 of the holding magnet 80 be held in the attracted position shown in FIGS. 1 and 6.

In the operation of the first tripping means just described, when the rate of rise of the current which flows through the separable contacts of the circuit interrupter shown in FIG. 1 exceeds a predetermined value, such as 500,000 amperes per second, a large change in the magnetic flux in the laminated magnetic structure 97 which is disposed around the main conductor 93 will result with a corresponding induced voltage in the portion of the main conductor 93 which passes through the magnetic structure 97. This induced voltage in the main conductor 93 is electrically in parallel with the bucking bar 95 and will produce a high momentary current through the bucking bar 95 which will increase the corresponding magnetomotive force due to current flow in the bucking bar 95 which opposes that due to current flow in the holding coil 89 to cause the armature 98 to be released and the separable contacts of the circuit interrupter to open. It is to be noted in FIG. 6 that in the disclosed arrangement, the first tripping means just described will actuate the tripping of the circuit interrupter in response to a predetermined rate of rise of current through the disclosed circuit interrupter in the forward direction as shown in FIG. 6. It is to be noted that in certain applications, the first tripping means described may be arranged to respond to a predetermined rate of rise of the current through the circuit interrupter in the reverse direction rather than to a predetermined rate of rise of current in the forward direction. It is also to be noted that the available energy or power to actuate the release of the armature 98 of the holding magnet 80 varies with the degree to which the rate of rise of the current which flows through the circuit interrupter exceeds the predetermined rate of rise necessary to cause the release of the armature 98 and that the available energy will be relatively less when the rate of rise of the current is only slightly greater than the predetermined rate of rise for which the first tripping means is arranged to respond than when the rate of rise exceeds the predetermined value by a larger margin.

In order to actuate the release of the armature 98 of the holding magnet 80 in response to a predetermined magnitude of current through the separable contacts of the disclosed circuit interrupter independently of the rate of rise of the current therethrough, the second tripping means 100 is disposed adjacent to one of the main conducting paths through the circuit interrupter which in this case is the lower conducting stud 54 on which the second tripping means 100 is mounted or disposed. Referring now to FIGS. 2 through 5 the second tripping means 100 comprises a pair of spaced magnetic members 112 and 114 which are disposed along a line which extends generally transversely with respect to the associated conductor 54 and as illustrated is spaced from the conductor or bus bar 54 to concentrate a portion of the magnetic flux which results when current flows through the conductor 54. In order to support the magnetic members 112 and 114 in a predetermined spaced relation adjacent to the conductor 54, the second tripping means 100 includes an electrically insulating housing in which the magnetic members 112 and 114 are disposed at the opposite ends thereof. The electrically insulating housing of the second tripping means 100 comprises a pair of spaced sidewalls 132, a top wall member 134, and a bottom wall member 136 which are secured together along with the associated magnetic members 112 and 114 by suitable means, such as the bolts 135 and 137. In order to secure the housing of the second tripping means 100 to the associated conductor 54, a pair of spaced supporting members or feet 138 may be secured to the associated housing at the opposite ends thereof by the bolts 135 and the supporting members 138 may, in turn, be secured to the conductor 54 by suitable means, such as the bolts 139.

It is to be noted that the magnetic members 112 and 114 are formed from a suitable soft magnetic material, such as iron. In order to actuate a pair of separable contacts 162 and 164 between open and closed positions when the current in the bus bar conductor 54 increases to a predetermined value, a magnetic sheet member or reed 116 is provided in the housing just described which extends or generally bridges the distance or spacing between the magnetic members 112 and 114. The magnetic sheet member 116 may be formed of a suitable soft magnetic material, such as iron or steel and is secured at one end to the magnetic member 112 by suitable means, such as the rivets 118. The free end of the magnetic sheet member 116 adjacent to the magnetic block 114 is normally spaced away from the magnetic block 114 by a predetermined air gap or non-magnetic gap, as indicated at 163 in FIG. 3. It is to be noted that the movable contact 162 is secured to the magnetic sheet member 116 adjacent to the free end thereof and, as illustrated, is normally spaced away from or in an open position with respect to the associated stationary contact member 164. The spacing between the contacts 162, 164 corresponding to a particular position of the free end of the sheet or reed member 116 is preferably less than the spacing between the free end of the sheet member 116 and the magnetic block 114 to insure that the contacts 162, 164 properly close when the free end of the sheet member 116 is attracted to engage the magnetic block 114.

Figure 5:
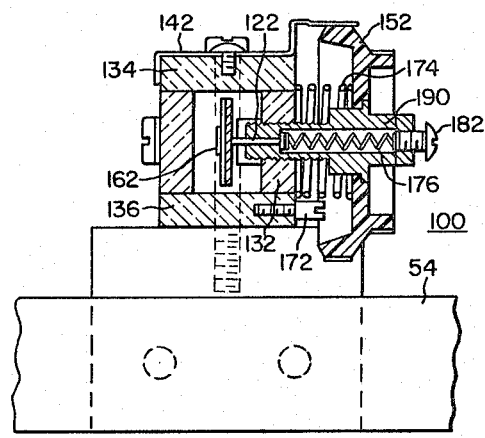
FIG. 5 is a side elevational view, partly in section, taken substantially along the line V—V of FIG. 2 of the tripping means shown in FIGS. 2, 3 and 4.

In order to normally actuate the free end of the magnetic sheet member 116 to an operating position which is spaced away from the magnetic member 114 by a predetermined air gap or non-magnetic gap and to apply a biasing force to the magnetic sheet member 116 which is generally transverse to and approximately midway along the length of the magnetic sheet member 116, the second tripping means 100 includes a biasing compression spring 176 and a pin 122 which is formed from a suitable non-magnetic material, such as non-magnetic type of stainless steel, and which is disposed to bear against one side of the magnetic sheet member 116 under the influence of the biasing spring 176. As best shown in FIG. 5, both the spring 176 and the pin 122 are slidably supported in an associated tubular housing 190 with the pin 122 projecting through an axial opening in the housing 190 at the left end to bear against the magnetic sheet member 116 and including a flange portion at the right end which bears against an adjacent shoulder portion inside the housing 190. The tubular housing 190 is also formed from a suitable nonmagnetic material, such as brass. The left end of the housing 190 is externally threaded with the housing 190 being supported in an internally threaded opening in the adjacent sidewall 132 of the insulating housing of the second tripping means 100 which is adapted to receive the housing 190. The left end of the spring 176 bears against the flanged portion of the pin 122 which acts as a spring seat. The right end of the spring 176 bears against an adjusting screw 182 which is disposed with the inner portion in an internally threaded opening which is adapted to receive the screw 182 at the right end of the housing 190, as viewed in FIG. 5. It is to be noted that the position of the screw 182 may be readily adjusted inside the right end of the housing 190 by rotation of the screw 182 to vary the biasing force exerted on the magnetic sheet member 116 by the spring 176 through the pin 122 and the corresponding predetermined current at which the magnetic sheet member 116 flexes or moves to close the separable contacts 162, 164.

The tubular housing 190 can also be rotated to adjust the position of the tubular housing 190 with respect to the housing wall 132 and to independently vary the biasing force applied by the spring 176 to the magnetic sheet member 116 through the pin 122 and to also vary the predetermined air gap or non-magnetic gap between the free end of the magnetic sheet member 116 and the adjacent magnetic member 116 during normal operating conditions.

Figure 2:
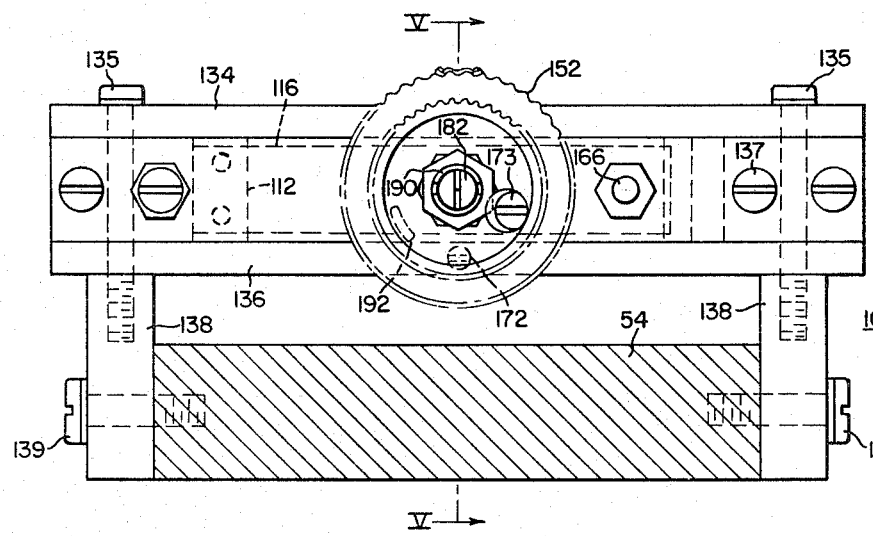
FIG. 2 is a front elevational view, partly in section, of a current responsive device or tripping means which forms part of the circuit interrupter shown in FIG. 1.
Figure 4:
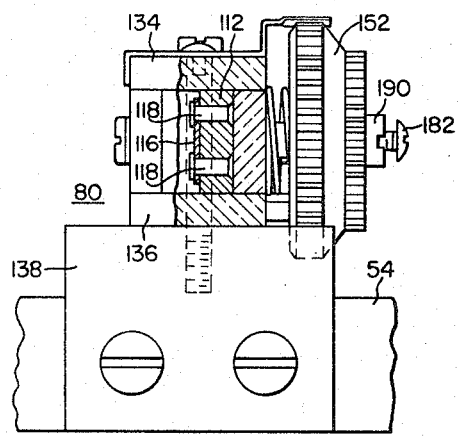
FIG. 4 is a side elevational view, partly in section and partly cut away, of the tripping means shown in FIGS. 2 and 3.

In order to permit limited adjustment of the position of the tubular housing 190 with respect to the housing wall 132 and to thereby permit limited adjustment of the biasing force exerted by the spring 176 on the magnetic sheet member 116 and the corresponding predetermined current at which the magnetic sheet member 116 flexes to close the separable contacts 162, 164, the adjusting knob 152 which is formed from a suitable electrically insulating material may be mounted concentrically on the tubular housing 190 as best shown in FIGS. 2 and 5. The tubular housing includes an intermediate portion having an external hexagonal cross-section which is adapted to normally cooperate with a central opening in the adjusting knob 152 having twelve sides. The control knob 152 includes a shoulder portion around the central opening which is adapted to bear against an adjacent shoulder portion provided on the outer periphery of the tubular housing 190 adjacent to the hexagonal portion under the influence of a biasing spring 174 which is disposed between the insulating housing of the second tripping means 100 and the inner surface of the control knob 152 around the tubular housing 190 as shown in FIG. 5. It is to be noted that the knob 152 may be manually pushed axially inwardly along the tubular housing 190 and rotated or indexed to any one of twelve positions with respect to the tubular housing 190 which are spaced around the periphery of the tubular housing at 30 degree intervals and that when the control knob 152 is released the knob 152 will be locked into engagement with the hexagonal portion of the tubular housing 190 by biasing spring 174 so that the tubular housing 190 will subsequently rotate with the control knob 152. In order to lock the control knob 152 in a particular position with respect to the tubular housing 190, the locking screw 173 may be disposed on the central portion of the knob 152 along with a lock washer which bears against the hexagonal portion of the tubular housing 190. In order to limit the rotation of the control knob 152 and the corresponding rotation of the tubular housing 190 to substantially one revolution, a stop member 172 may be mounted on the bottom housing wall 136 to engage a corresponding projecting member disposed on the inner surface of the control knob 152, as indicated at 192 in FIG. 2. In order to resiliently retain the control knob 152 in a particular position to which it is rotated, the spring clip 142 may be secured to the top wall member 134 by suitable means such as a screw with a projecting portion of the spring 142 adapted to engage the corrugated or serrated outer periphery of the control knob 152, as best shown in FIGS. 2 and 5.

In the operation of the second tripping means 100, when the current in the bus bar conductor 54 exceeds a predetermined value and the magnetic flux which is produced thereby in the magnetic sheet member 116 exceeds a corresponding value, the free end of the magnetic sheet member 116 will be magnetically attracted toward the magnetic member 114 and the magnetic sheet member 116 will deflect toward the magnetic member 114 to thereby close the separable contacts 162 and 164 of the second tripping means 100. When the contacts 162, 164 of the second tripping means 100 close, the trip coil 91 as shown in FIG. 7 will be energized from the source of direct current power indicated at the terminals P1, P2 through the contacts 162, 164, the resistor 222 and the auxiliary contacts AC which are actuated between a closed position when the separable contacts of the circuit interrupter shown in FIG. 1 are closed and an open position when the separable contacts of the circuit interrupter are open. It is important to note that since most of the magnetic flux path provided by the second tripping means which surrounds the bus bar or conductor 54 is through air or other non-magnetic materials and only a relatively small portion of the magnetic flux path around the bus bar 54 is through the magnetic sheet member 116 and the magnetic members 112 and 114, the magnetic flux which passes through the magnetic sheet member 116 will more closely follow in time changes in the current which flows in the bus bar or conductor 54 because of the much smaller eddy currents and hysteresis currents in the magnetic flux path provided in the second tripping means 100 which tend to produce a slight time delay in the response or movement of the magnetic sheet member 116 when the predetermined current in the bus bar 54 is exceeded. In addition, the mechanical inertia of the magnetic sheet member 116 is relatively low to increase the speed of response of the second tripping means 100 when the predetermined current in the bus bar 54 is exceeded. The impedance of the trip coil 91 to which the contacts of the second tripping means 100 is electrically connected should also be a relatively low impedance to increase the tripping action speed in the overall circuit interrupter shown in FIG. 1. As shown in FIG. 6 when the tripping coil 91 is energized, the magnetic flux which is produced by the magnetomotive force when current flows through the tripping coil 100 opposes the magnetic flux produced by current flow in the holding coil 89 to thereby reduce the magnetic flux which is effective to hold the armature 98 in the attracted position and to release the armature 98 and to actuate the opening of the separable contacts of the circuit interrupter shown in FIG. 1 as previously described.

It is to be noted that the current path through the second tripping means 100 extends from the terminal 156 at the left end of the second tripping means 100 through the magnetic member 112, the rivets 118, the magnetic sheet member 116, the movable contact 162, and the stationary contact 164 to the terminal 166 at the other end of the second tripping means 100. The magnetic member 114 is beveled adjacent to the stationary contact 164 as indicated at 114A to increase the electrical creepage path between the magnetic member 114 and the stationary contact 164 to thereby substantially eliminate the possibility of a flash over between the magnetic sheet member 116 to the magnetic block or member 114 and from the magnetic block 114 to the stationary contact 164.

In initially calibrating the second tripping means 100, the locking screw 173 which otherwise restrains the axial movement of the knob 152 with respect to the tubular housing 190 is removed or rotated axially outwardly to disengage the knob 152 from the hexagonal portion of the tubular housing 190 which can then be rotated or turned to establish or adjust the minimum air gap or non-magnetic gap, as indicated at 163, between the free end of the magnetic sheet member 116 and the magnetic block 114 and also to adjust the biasing force exerted on the magnetic sheet member 116 by the biasing spring 176. The control knob 152 can then be locked on the tubular housing 119 by the locking screw 173 as previously explained. The minimum predetermined current at which the magnetic sheet member 116 will flex or deflect to close the separable contacts 162 and 164 can then be adjusted more precisely by the adjusting screw 182 which varies the biasing force exerted on the magnetic sheet member 116 by the biasing spring 176 as previously explained. The tripping current at which the magnetic sheet member deflects can then be adjusted when desired over a predetermined range by rotation of the control knob with the tubular housing 190 to thereby adjust within a limited range the position of the tubular housing 190 with respect to the insulating housing of the second tripping means 100 and the corresponding biasing force exerted on the magnetic sheet member 116 by the biasing spring 176 with the rotation of the knob 152 and the tubular housing 190 being limited by the stop means 172, 192 previously described to substantially one revolution. The range in which the tripping current may be conveniently adjusted by the knob 152 can be arranged to be between 100 percent and 200 percent of a desired minimum tripping current.

It is important to note that the tripping of the circuit interrupter shown in FIG. 1 by the second tripping means 100 is accomplished independently of the first tripping means 80 previously described since the armature 98 of the holding magnet 80 will be released independently whenever a predetermined rate of rise or change with respect to time occurs in the current which flows through the separable contacts of the circuit interrupter shown in FIG. 1 or when said current exceeds a predetermined value which is determined by the operating characteristics of the second tripping means just described. It is also important to note that the energy available to actuate the tripping of the circuit interrupter shown in FIG. 1 in response to a predetermined magnitude or value of current which flows through the separable contacts of the circuit interrupter as determined by the second tripping means 100 is independent of the magnitude of the current to which the second tripping means 100 responds since the energy for the tripping coil 91 is obtained from a source of direct current power or voltage as shown in FIG. 7 and is independent of the magnitude of the over current or fault current to which the second tripping means 100 responds.

It is to be understood that the second tripping means 100 as disclosed may be employed in certain applications as the only tripping means in a particular circuit interrupter where it is desired that the circuit interrupter be automatically tripped only in response to a predetermined magnitude of current rather than also responding independently to a predetermined rate of rise in the current in the circuit being protected. It is also to be understood that a second tripping means or current responsive device 100 as disclosed may be employed to actuate other control operations rather than to actuate the tripping of a circuit interrupter as disclosed.

The apparatus embodying the teachings of this invention has several advantages. For example, a circuit interrupter including a first tripping means and a second tripping means as disclosed is independently responsive to either a predetermined rate of rise in current in the circuit being protected or to a predetermined magnitude of current in the circuit being protected. In addition, it has been found that the speed of response of the second tripping means which is responsive to a predetermined magnitude of current is relatively fast compared with known methods for actuating the tripping of a direct current circuit breaker to fault currents of that type. As previously mentioned, the fast speed of response of the second tripping means as disclosed is due, in part, to the fact that the magnetic flux path around the conductor 54 is through the relatively short length of the magnetic sheet member 116 and the magnetic blocks 112 and 114 and through the relatively long length of air or other non-magnetic materials which complete the magnetic flux path around the conductor 54 also to the fact that the mechanical inertia of the magnetic sheet member 116 is relatively low compared with the magnetic forces acting on the magnetic sheet member 116 in the disclosed construction. A circuit interrupter including a first and a second tripping means as disclosed also permits the use of a common holding magnet which is actuated by either the first tripping means as disclosed or by the second tripping means as disclosed. Finally, the energy available to actuate the release of the armature in a holding magnet structure as disclosed in response to the operation of the second tripping means 100 is independent of the magnitude of the overcurrent or fault current to which the second tripping means responds.

Since numerous changes may be made in the above described apparatus and different embodiments of the invention may be made without departing from the spirit and scope thereof, it is intended that all the matter contained in the foregoing description or shown in the accompanying drawings shall be interpreted as illustrative and not in a limiting sense.

We claim:

1. A circuit interrupter comprising a pair of relatively movable main contacts, operating means for actuating the contacts between open and closed positions, first tripping means responsive to current through the contacts to automatically actuate the operating means to open the contacts when the rate of rise of the current through the contacts exceeds a predetermined value, and second tripping means responsive to current through the contacts independently of said first tripping means to automatically actuate the same operating means to open the contacts when the magnitude of the current through the contacts exceeds a predetermined value independently of the rate of rise of the current.

2. A circuit interrupter comprising a pair of relatively movable main contacts, a conducting member connected in series circuit relation with the contacts of the circuit interrupter, operating means for actuating the contacts between open and closed positions, first means responsive to current through the contacts, to automatically actuate the operating means to open the contacts when the rate of rise of the current exceeds a predetermined value, and second means responsive to current through the contacts to automatically actuate the operating means to open the contacts when the magnitude of the current exceeds a predetermined value independently of the rate of rise of the current, said second current responsive means comprising a pair of spaced magnetic members disposed adjacent to the conducting member, a relatively thin magnetic sheet member extending generally transversely of the conducting member with a relatively stationary end disposed adjacent to one of the magnetic members and with the other free end disposed adjacent to the other magnetic member and movable away from and toward the other magnetic member in response to the current in the conducting member, a relatively movable contact disposed on the sheet member adjacent to the free end, a relatively stationary contact disposed to be engaged by the movable contact and means disposed adjacent to the sheet member for normally biasing the free end of the sheet member away from the other magnetic member.

3. The combination as claimed in claim 2 wherein the last-mentioned means comprises a tubular member disposed generally transversely with respect to the magnetic sheet member, a substantially non-magnetic elongated member disposed at least partially inside the tubular member and a compression spring disposed inside the tubular member to bias the elongated member into engagement with the magnetic sheet member.

4. A current responsive device adapted to be mounted adjacent to a current carrying conductor comprising a pair of magnetic members, means for supporting the magnetic members in spaced relation along a line which is generally transverse to the conductor, a magnetic sheet member having a relatively stationary end disposed adjacent to one of the magnetic members and a free end disposed adjacent to the other magnetic member and movable toward and away from the other magnetic member in response to changes in the current in the conductor, separable contact means disposed to be actuated by the movement of the magnetic sheet member between open and closed positions, means disposed adjacent to the magnetic sheet member for applying a biasing force to the magnetic sheet member generally transversely with respect to the magnetic sheet member to bias the free end of the magnetic sheet member away from the other magnetic member, the last-mentioned means comprising a tubular member mounted on the supporting means adjacent to the magnetic sheet member, a substantially non-magnetic pin at least partially disposed inside the tubular member and a compression spring disposed inside the tubular member to bias the pin into engagement with the magnetic sheet member.

5. A current responsive device adapted to be mounted adjacent to a current carrying conductor comprising a pair of magnetic members, means for supporting the magnetic members in spaced relation along a line which is generally transverse to the conductor, a magnetic sheet member having a relatively stationary end disposed adjacent to one of the magnetic members and a free end disposed adjacent to the other magnetic member and movable toward and away from the other magnetic member in response to changes in the current in the conductor, and separable contact disposed to be actuated by the movement of the magnetic sheet member between open and closed positions, the magnetic flux path around the conductor which includes the magnetic members and the magnetic sheet members being formed of predominantly non-magnetic material.

6. The combination as claimed in claim 1 wherein the circuit interrupter includes a holding magnet having associated therewith an armature which is releasable from an attracted position with respect to said holding magnet to actuate the operating means to open the contacts of the circuit interrupter, the armature associated with said holding magnet being releasable independently either by said first tripping means in response to a predetermined rate of rise of the current through the contacts or by said second tripping means in response to a predetermined magnitude of the current through the contacts.

References Cited

UNITED STATES PATENTS

| 2,150,566 | 3/1939 | Scott | 335—174 |
| 2,474,029 | 6/1949 | Bohn | 335—174 |
| 2,735,041 | 2/1956 | Wurgler | 335—182 |
| 3,264,427 | 8/1966 | Hurtle | 200—116 |

BERNARD A. GILHEANY, *Primary Examiner.*

H. BROOME, *Assistant Examiner.*